United States Patent
Sumner

[19]

[11] Patent Number: 6,041,227
[45] Date of Patent: Mar. 21, 2000

[54] METHOD AND APPARATUS FOR REDUCING TRANSMISSION TIME REQUIRED TO COMMUNICATE A SILENT PORTION OF A VOICE MESSAGE

[75] Inventor: Terence Edward Sumner, Azle, Tex.

[73] Assignee: Motorola, Inc., Schaumburg, Ill.

[21] Appl. No.: 08/921,638

[22] Filed: Aug. 27, 1997

[51] Int. Cl.[7] .................................................. H04Q 7/20
[52] U.S. Cl. ................................ 455/412; 379/88.1
[58] Field of Search ............................ 379/88.04, 80, 379/88.08, 88.09, 88.25, 88.26, 88.1; 455/72, 412, 413, 414, 32.1, 673, 70, 425, 38.5, 514, 515; 704/270

[56] References Cited

U.S. PATENT DOCUMENTS

| | | | |
|---|---|---|---|
| 4,247,910 | 1/1981 | Cornell et al. | 379/88.28 |
| 4,375,083 | 2/1983 | Maxemchuk | 379/88.27 |
| 4,783,797 | 11/1988 | Hashimoto | 379/80 |
| 4,875,038 | 10/1989 | Siwiak et al. | |
| 5,475,712 | 12/1995 | Sasaki | 455/281 |
| 5,619,554 | 4/1997 | Hogan et al. | 379/88.08 |
| 5,742,930 | 4/1998 | Howitt | 704/502 |
| 5,873,058 | 2/1999 | Yajima et al. | 704/201 |
| 5,889,838 | 3/1999 | Miura | 379/80 |

Primary Examiner—Dwayne D. Bost
Assistant Examiner—Jean A. Gelin
Attorney, Agent, or Firm—R. Louis Breeden

[57] ABSTRACT

A controller (112) processes (400, 500, 600) an original voice message to detect (602) an original silent portion and to measure (604) an original duration, and the controller creates (620) a modified voice message by replacing (620) the original silent portion with a modified silent portion having a transmission duration. The transmission duration is derived (612, 614, 618) from the original duration, and the transmission duration is shorter than the original duration. The controller then transmits (622) the modified voice message.

18 Claims, 6 Drawing Sheets

METHOD AND APPARATUS FOR REDUCING TRANSMISSION TIME REQUIRED TO COMMUNICATE A SILENT PORTION OF A VOICE MESSAGE

FIELD OF THE INVENTION

This invention relates in general to voice messaging systems, and more specifically to a method and apparatus for reducing transmission time required to communicate a silent portion of a voice message.

BACKGROUND OF THE INVENTION

Modern voice messaging systems utilize several techniques to achieve transmission efficiency. Overlap-add time compression of speech is one such technique. This technique works well up to a compression ratio of about 2.5:1. Of course, service providers would like to be able to achieve even higher compression to further improve transmission efficiency.

A limitation of prior art voice messaging systems has been that voiced speech, unvoiced speech, and silence (i.e., pauses in speech) are processed exactly the same. This does not achieve maximum transmission efficiency, because silence, which contains very little information, can be compressed much more than 2.5:1 with little impact on voice quality.

Thus, what is needed is a method and apparatus that can achieve a greater compression ratio for speech pauses. Preferably, the method and apparatus will accomplish this in a manner that restores the pauses during message playback so that the rhythm of the message remains natural.

SUMMARY OF THE INVENTION

An aspect of the present invention is a method for reducing a transmission time required for communicating an original silent portion of an original voice message in a voice messaging system, the original silent portion having an original duration. The method comprises the steps of processing the original voice message to detect the original silent portion and to measure the original duration, and creating a modified voice message by replacing the original silent portion with a modified silent portion having a transmission duration. The transmission duration is derived from the original duration, and the transmission duration is shorter than the original duration. The method also includes the step of transmitting the modified voice message.

Another aspect of the present invention is a controller for reducing a transmission time required for communicating an original silent portion of an original voice message in a voice messaging system, the original silent portion having an original duration. The controller comprises an input interface for receiving the original voice message, and a processing system coupled to the input interface for processing the original voice message to detect the original silent portion and to measure the original duration. The processing system is programmed to create a modified voice message by replacing the original silent portion with a modified silent portion having a transmission duration. The transmission duration is derived from the original duration, and the transmission duration is shorter than the original duration. The controller further comprises an output interface coupled to the processing system for transmitting the modified voice message.

Another aspect of the present invention is a subscriber unit, comprising a receiver for receiving a modified voice message including a modified silent portion having a transmission duration, and a processing system coupled to the receiver for processing the modified voice message to detect the modified silent portion and to measure the transmission duration. The processing system is programmed to form a replica of the original voice message by replacing the modified silent portion with a restored silent portion having a restored duration. The restored duration is derived from the transmission duration, and the restored duration is longer than the transmission duration. The subscriber unit further comprises an audio interface coupled to the processing system for reproducing the replica of the original voice message.

DETAILED DESCRIPTION OF THE DRAWINGS

Figure 1:
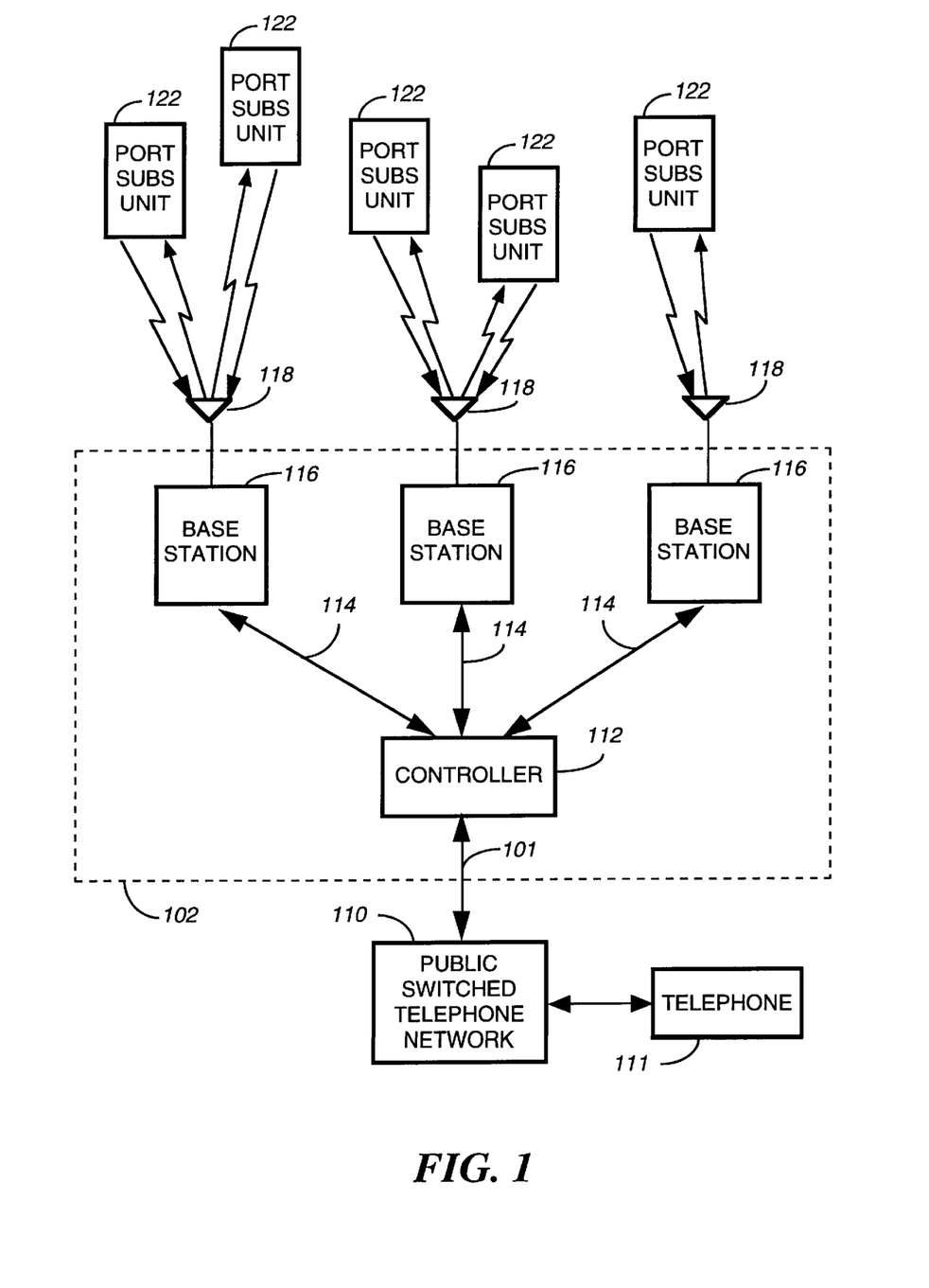
FIG. 1 is an electrical block diagram of a voice messaging system in accordance with the present invention.

Referring to FIG. 1, an electrical block diagram of a voice messaging system in accordance with the present invention comprises a fixed portion 102 including a controller 112 and a plurality of base stations 116, and a portable portion including a plurality of portable subscriber units 122, preferably having acknowledge-back capability. The base stations 116 are used for communicating with the portable subscriber units 122 utilizing conventional radio frequency (RF) techniques, and are coupled by communication links 114 to the controller 112, which controls the base stations 116.

The hardware of the controller 112 is preferably a combination of the Wireless Messaging Gateway (WMG™) Administrator! paging terminal, and the RF-Conductor!™ message distributor manufactured by Motorola, Inc. The hardware of the base stations 116 is preferably a combination of the Nucleus® Orchestra! transmitter and RF-Audience!™ receivers manufactured by Motorola, Inc. The hardware of the portable subscriber unit 122 is preferably similar to that of the Tenor™ voice messaging unit also manufactured by Motorola, Inc. It will be appreciated that other similar hardware can be utilized as well for the controller 112, the base stations 116, and the portable subscriber units 122.

Each of the base stations 116 transmits RF signals to the portable subscriber units 122 via a transceiver antenna 118. The base stations 116 each receive RF signals from the plurality of portable subscriber units 122 via the transceiver antenna 118. The RF signals transmitted by the base stations 116 to the portable subscriber units 122 (outbound messages) comprise selective call addresses identifying the portable subscriber units 122, and voice messages originated by a caller, as well as commands originated by the controller 112 for adjusting operating parameters of the radio communication system. The RF signals transmitted by the portable subscriber units 122 to the base stations 116 (inbound messages) comprise responses that include scheduled messages, such as positive acknowledgments (ACKs) and negative acknowledgments (NAKs), and unscheduled messages, such as registration requests. An embodiment of an acknowledge-back messaging system is described in U.S. Pat. No. 4,875,038 issued Oct. 17, 1989 to Siwiak et al., which is hereby incorporated herein by reference. It will be appreciated that, alternatively, the present invention can be applied to a one-way voice messaging system as well.

The controller 112 preferably is coupled by telephone links 101 to a public switched telephone network (PSTN) 110 for receiving selective call message originations therefrom. Selective call originations comprising voice messages from the PSTN 110 can be generated, for example, from a conventional telephone 111 coupled to the PSTN 110. It will be appreciated that, alternatively, other types of communication networks, e.g., packet switched networks and local area networks, can be utilized as well for transporting originated messages to the controller 112.

The protocol utilized for outbound and inbound messages is preferably selected from Motorola's well-known FLEX™ family of digital selective call signaling protocols. These protocols utilize well-known error detection and error correction techniques and are therefore tolerant to bit errors occurring during transmission, provided that the bit errors are not too numerous in any one code word. It will be appreciated that other suitable protocols can be used as well.

Figure 2:
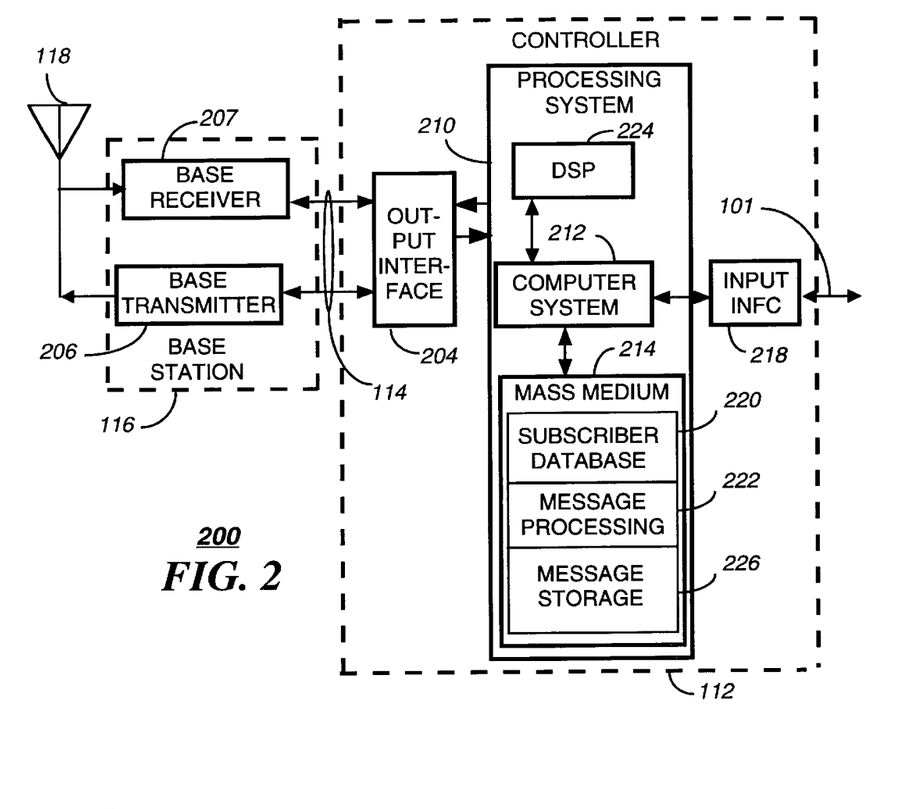
FIG. 2 is an electrical block diagram of portions of a controller and base station in accordance with the present invention.

FIG. 2 is a simplified electrical block diagram 200 of portions of the controller 112 and the base station 116 in accordance with the present invention. The controller 112 includes a processing system 210, a conventional output interface 204, and a conventional input interface 218.

The base station 116 includes a base transmitter 206 and at least one base receiver 207. At least a portion of the processing performed on the voice messages preferably is implemented in at least one digital signal processor (DSP) 224 executing software readily written by one of ordinary skill in the art, given the teachings of the instant disclosure. Alternatively, the voice processing may be implemented all or in part as one or more integrated circuits. In particular, the preferred embodiment uses a model TMS320C31 DSP manufactured by Texas Instruments, Inc. It will be appreciated that, alternatively, other similar DSPs can be utilized as well for the DSP 224.

The processing system 210 is used for directing operations of the controller 112. The processing system 210 preferably is coupled through the output interface 204 to the base transmitter 206 via the communication link 114. The processing system 210 preferably also is coupled through the output interface 204 to the base receiver 207 via the communication link 114. The communication link 114 utilizes, for example, conventional means such as a direct wire line (telephone) link, a data communication link, or any number of radio frequency links, such as a radio frequency (RF) transceiver link, a microwave transceiver link, or a satellite link, just to mention a few. The processing system 210 is also coupled to the input interface 218 for accepting outbound voice messages originated by callers communicating via the PSTN 110 through the telephone links 101.

In order to perform the functions necessary for controlling operations of the controller 112 and the base stations 116, the processing system 210 preferably includes a conventional computer system 212, and a conventional mass storage medium 214. The conventional mass storage medium 214 includes, for example, a subscriber database 220, comprising subscriber user information such as addressing and programming options of the portable subscriber units 122.

The conventional computer system 212 is preferably programmed by way of software included in the conventional mass storage medium 214 for performing the operations and features required in accordance with the present invention. The conventional computer system 212 preferably comprises a plurality of processors such as VME Sparc™ processors manufactured by Sun Microsystems, Inc. These processors include memory such as dynamic random access memory (DRAM), which serves as a temporary memory storage device for program execution, and scratch pad processing such as, for example, storing and queuing messages originated by callers using the PSTN 110, processing acknowledgments received from the portable subscriber units 122, and protocol processing of messages destined for the portable subscriber units 122. The conventional mass storage medium 214 is preferably a conventional hard disk mass storage device.

It will be appreciated that other types of conventional computer systems 212 can be utilized, and that additional computer systems 212, DSPs 224 and mass storage media 214 of the same or alternative type can be added as required to handle the processing requirements of the processing system 210. It will be further appreciated that additional base receivers 207 either remote from or collocated with the base transmitter 206 can be utilized to achieve a desired inbound sensitivity, and that additional, separate antennas 118 can be utilized for the base transmitter 206 and the base receivers 207.

The mass medium 214 preferably includes software and various databases utilized in accordance with the present invention. In particular, the mass medium 214 includes a message processing element 222 which programs the processing system 210 to perform in accordance with the present invention, as will be described further below. In addition, the mass medium 214 includes a message storage area 226 for storing digitized voice messages. It will be appreciated that the controller 112 and the base station 116 can be either collocated or remote from one another, depending upon system size and architecture. It will be further appreciated that in large systems functional elements of the controller 112 can be distributed among a plurality of networked controllers.

Figure 3:
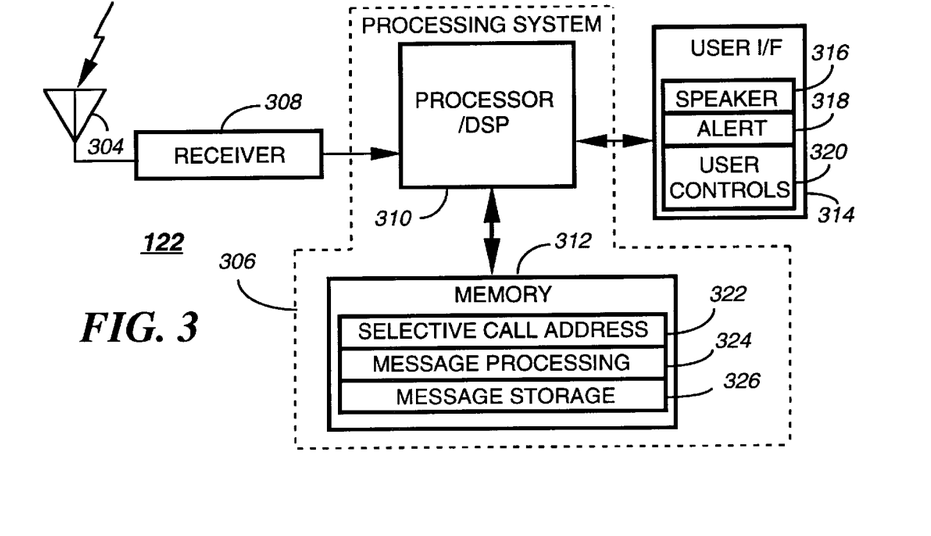
FIG. 3 is an electrical block diagram of a subscriber unit in accordance with the present invention.

Referring to FIG. 3, an electrical block diagram of the subscriber unit 122 in accordance with the present invention comprises an antenna 304 for intercepting transmissions from the base stations 116. The antenna 304 is coupled to a conventional receiver element 308 for receiving the transmissions to derive information therefrom. The receiver element 308 is coupled to a processing system 306, comprising a conventional processor 310, preferably a digital signal processor (DSP) similar to that of the controller 112, for processing the received information. The processing system 306 is also coupled to a user interface 314 for conveying portions of the received information to a user, via, for example, a conventional speaker 316. The user interface 314 also includes a conventional alert element 318 for alerting the user that new information has arrived. In addition, the user interface 314 includes well-known user controls 320 for controlling the subscriber unit 122. The processor 310 is coupled to a conventional memory 312 for storing a selective call address 322 to which the subscriber unit 122 is responsive. The memory also includes a message processing element 324 for programming the processing system in accordance with the present invention, and a message storage element 326 for storing a digitized voice message during message processing.

Figure 4:
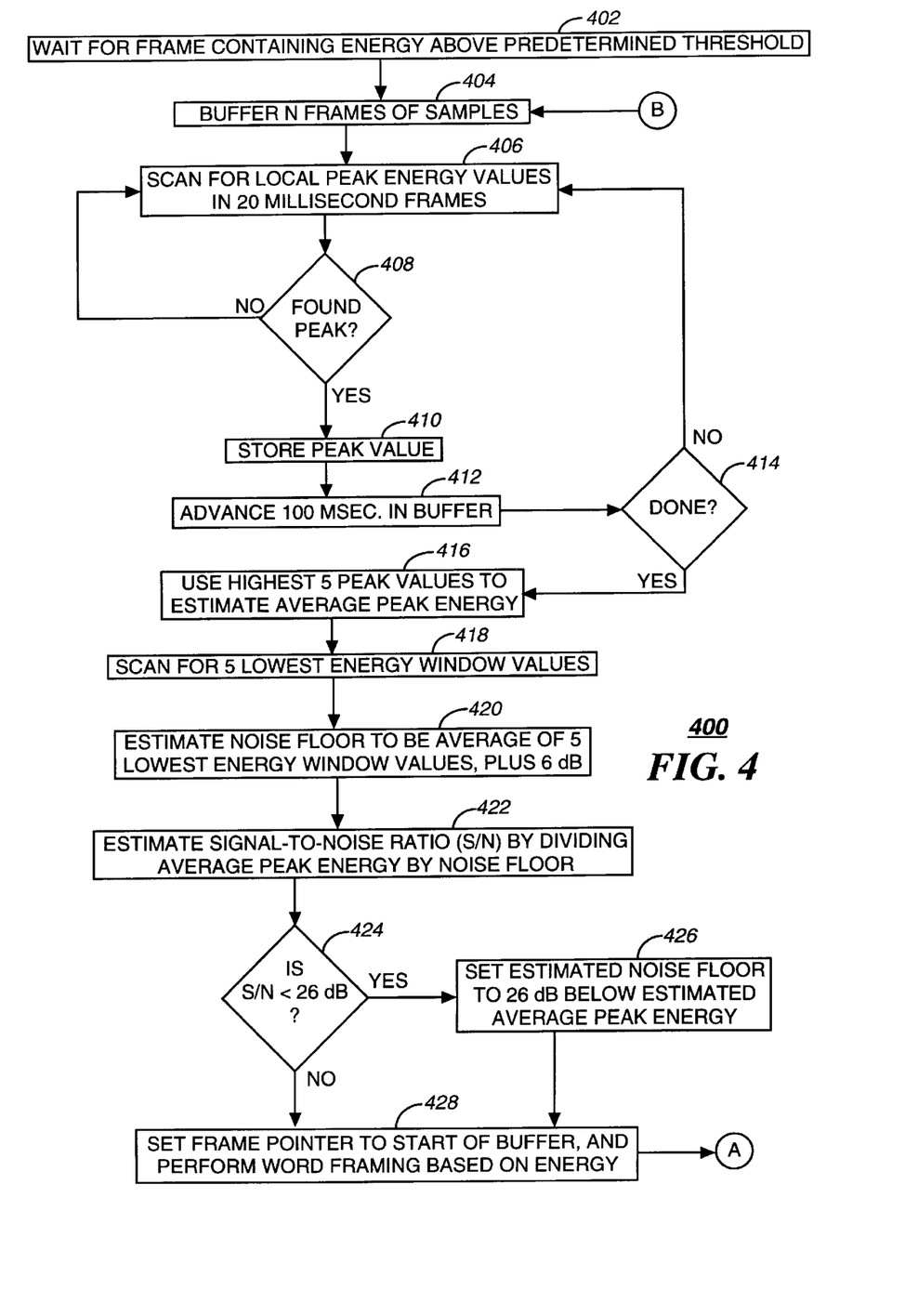
FIGS. 4 and 5 are exemplary flow charts depicting a method for differentiating speech from silence in accordance with the present invention.
Figure 5:
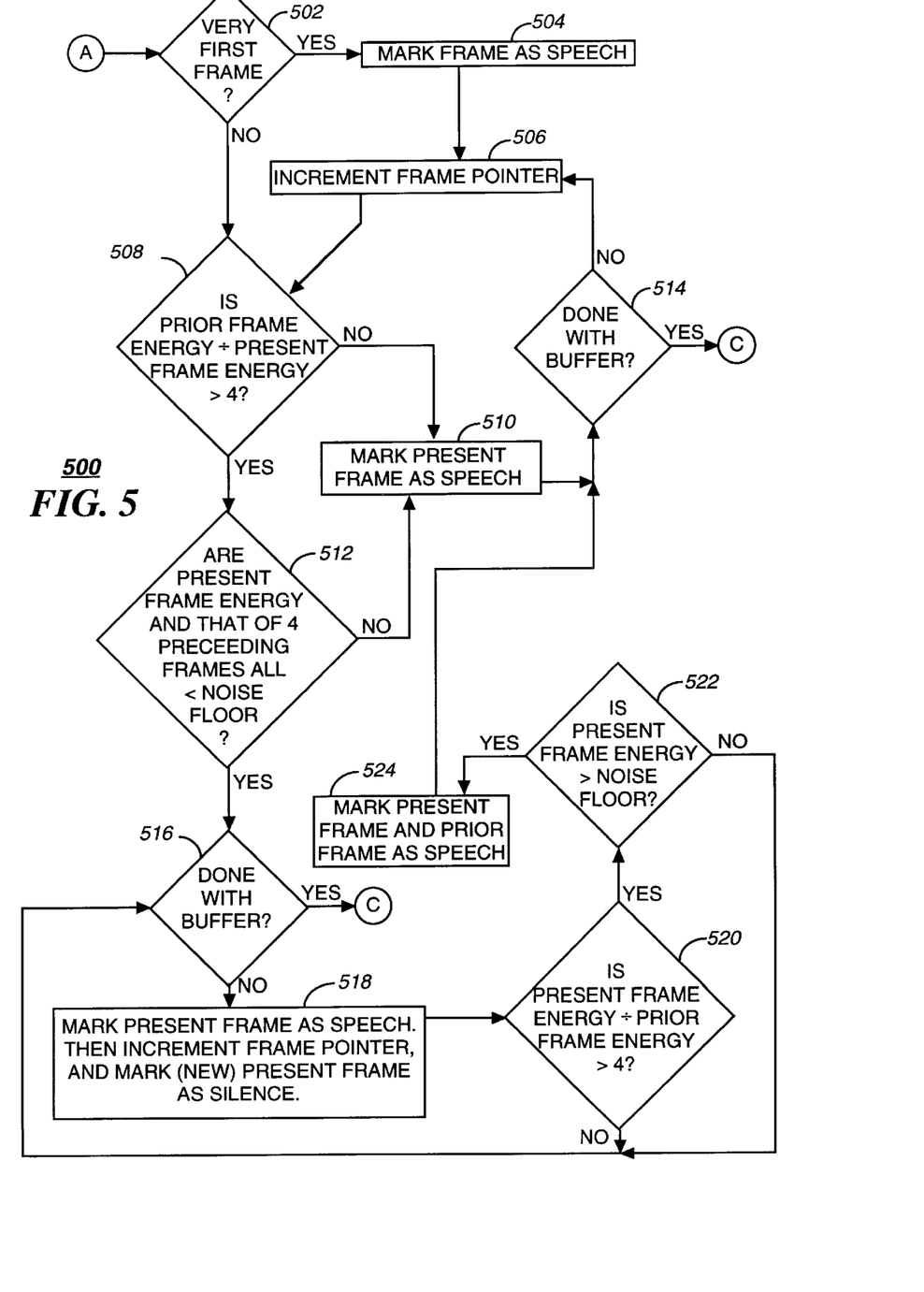

FIGS. 4 and 5 are exemplary flow charts 400, 500 depicting a method for differentiating speech from silence in accordance with the present invention. The flow chart 400 begins when the processing system 210 accesses the message storage area 226 to retrieve a message for processing. The processing system 210 begins examining frames of data samples created through well-known techniques and corresponding to the message, and waits 402 before starting voice processing until a frame containing energy above a predetermined threshold, e.g., 43 dB below a maximum possible digitized signal level, is located. The processing system 210 then buffers 404 a predetermined number of frames, preferably two seconds worth (initial pass), or one-hundred frames each representing twenty-milliseconds of speech, for processing in accordance with the present invention. On passes after the initial pass, fewer frames, e.g., 160 milliseconds worth, preferably are buffered to facilitate processing. The DSP 224 then scans 406, 408 the buffered samples, preferably using a twenty-millisecond window, to find and measure a local peak RMS energy value. After finding a peak RMS energy value, the processing system 210 then stores 410 the peak RMS energy value. The processing system 210 then preferably advances 412 one-hundred milliseconds in the buffer to ensure that the peak RMS energy of a single word does not dominate the calculated peak value for the buffer. The processing system 210 then checks 414 whether the scanning of the entire buffer has been completed. If not, the flow returns to step 406 for more scanning. If so, the processing system uses 416 the highest five peak RMS energy values to estimate the average peak RMS energy, i.e., the processing system 210 sums the highest five peak RMS energy values and divides by five. The DSP then scans 418 the buffer to locate and measure the five lowest energy window values. The processing system 210 then preferably estimates 420 the noise floor to be the average of the five lowest energy window values, plus six dB. The processing system then estimates 422 the signal-to-noise ratio (S/N) to be the estimated average peak RMS energy divided by the estimated noise floor. The processing system 210 checks 424 whether the S/N is less than a predetermined value, e.g., 26 dB. If so, the processing system 210 sets 426 the estimated noise floor to a value equal to the estimated average peak RMS energy, less the predetermined value (in dB). The processing system 210 then sets 428 a frame pointer to the start of the buffer and moves to step 502 of the flow chart 500 (FIG. 5) to begin performing word framing, i.e., to mark each frame as either speech or silence, based on energy. If, on the other hand, at step 424 the processing system 210 finds the S/N to be at least 26 dB, then the flow moves directly to step 428 without readjusting the estimated noise floor. Then the flow moves to step 502 (FIG. 5).

At step 502 the processing system 210 checks whether the frame pointed to by the present value of the frame pointer (said frame defined herein as the "present frame") is the very first frame being word framed. If so, the processing system 210 marks 504 the frame as speech (to be conservative). The processing system 210 then increments 506 the frame pointer by unity and then checks 508 whether the immediately prior frame's average peak RMS energy divided by the present frame's average peak RMS energy is, by way of example, greater than 4. On the other hand, if at step 502 the processing system 210 determines that the frame pointed to by the present value of the frame pointer is not the very first frame being word framed, then the flow moves directly to step 508. If at step 508 the processing system 210 determines that the prior frame's average peak RMS energy divided by the present frame's average peak RMS energy is not greater than 4, then the processing system 210 marks 510 the present frame as speech. If, on the other hand at step 508 the processing system 210 determines that the prior frame's average peak RMS energy divided by the present frame's average peak RMS energy is greater than 4, then the processing system 210 checks 512 whether the present frame's average peak RMS energy and the average peak RMS energy of each of the four contiguous preceding frames all are less than the estimated noise floor. If not, the processing system 210 moves to step 510 to mark the present frame as speech. In any event, after step 510 the flow moves to step 514, where the processing system 210 checks to see whether the buffer has been completely processed. If so, the flow moves to step 602 (FIG. 6) to continue processing. If not, the flow returns to step 506 to increment the frame pointer and to continue processing the current buffer.

If, on the other hand, at step 512 the processing system 210 finds that the present frame's average peak RMS energy and the average peak RMS energy of each of the four contiguous preceding frames all are less than the estimated noise floor, then the processing system 210 checks 516 whether the entire buffer has been processed. If so, the processing system 210 moves to step 602 (FIG. 6) to continue processing. If not, the processing system 210 marks 518 the present frame as speech, then increments the frame pointer and marks the (new) present frame as silence. The processing system 210 then checks 520 whether the present frame's average peak RMS energy divided by the prior frame's average peak RMS energy is greater than four. If not, the flow returns to step 516. If so, the flow moves to step 522, where the processing system 210 checks whether the present frame's average peak RMS energy is greater than the noise floor. If not, the flow returns to step 516. If so, the flow moves to step 524, where the processing system 210 marks the present frame and the frame immediately prior to the present frame as speech. Flow then returns to step 514 for processing the next frame. It will be appreciated that other methods, different from the exemplary method described in the flow charts 400, 500 also can be utilized for distinguishing speech and silence in accordance with the present invention.

Figure 6:
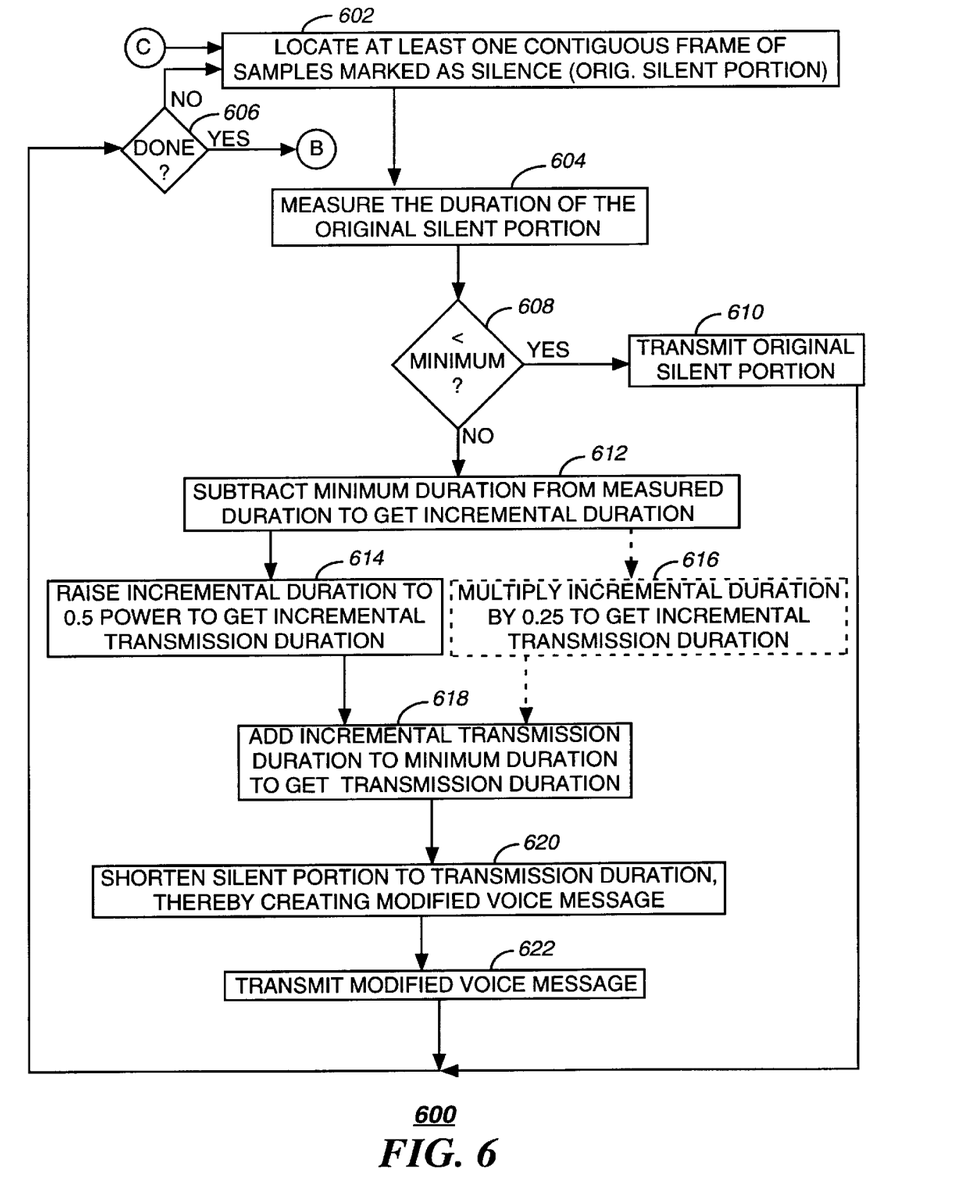
FIG. 6 is a flow chart depicting a method for processing periods of silence in speech in the controller in accordance with the present invention.

FIG. 6 is a flow chart 600 depicting a method for processing periods of silence in speech in the controller 112 in accordance with the present invention. At step 602 the processing system 210 examines the buffer to locate at least one contiguous frame of samples marked as silence. This silent portion of the message also is referred to herein as the "original silent portion." The processing system 210 then measures 604 the duration of the original silent portion, e.g., by counting the number of frames in the original silent portion. The processing system 210 then checks 608 whether the duration is less than a predetermined minimum duration that can be reliably detected by the subscriber unit 122, e.g., 40 milliseconds. If so, the processing system 210 will transmit the original silent portion unchanged. If however, the duration is not less than the predetermined minimum duration, then the processing system 210 subtracts 612 the predetermined minimum duration from the measured duration to derive an incremental duration. The processing system 210 then preferably raises 614 the incremental duration to a fractional power, e.g., 0.5 (equivalent to taking the square root of the incremental duration) to derive the incremental transmission duration. Alternatively, the processing system 210 can multiply the incremental duration by a fraction, e.g., 0.25, to derive the incremental transmission duration. It will be appreciated that other mathematical functions can be applied as well to reduce the duration of the original silent portion before transmission. It will be further appreciated that to conserve processing power, the duration values can be measured in relatively large segments and rounded to integer values, as great accuracy is not required. For example, duration can be expressed in segments of 5 milliseconds each (20 msec.=4 segments; 33 msec.=7 segments; 157 msec.=31 segments).

After applying the duration reducing function, the processing system 210 adds 618 the incremental transmission duration to the predetermined minimum duration to derive the transmission duration (i.e., the actual duration which will be used when transmitting the silent portion). Next the processing system 210 shortens the original silent portion to the mathematically derived transmission duration, thereby creating a modified voice message. The shortening is preferably accomplished through well-known overlap-add techniques. Alternatively, an appropriate duration of pure silence or artificially generated noisy silence can be substituted for the original silent portion, as well. The processing system 210 then places 622 the modified voice message into a transmission area of the message storage area 226, where the modified voice message will await transmission. Flow then proceeds to step 606 where the processing system 210 checks whether the entire buffer has been processed. If not, the flow returns to step 602 to search for another silent portion to process. If, on the other hand, at step 606 the entire buffer has been processed, then the flow returns to step 404 (FIG. 4) to get another buffer of N frames of samples.

Figure 7:
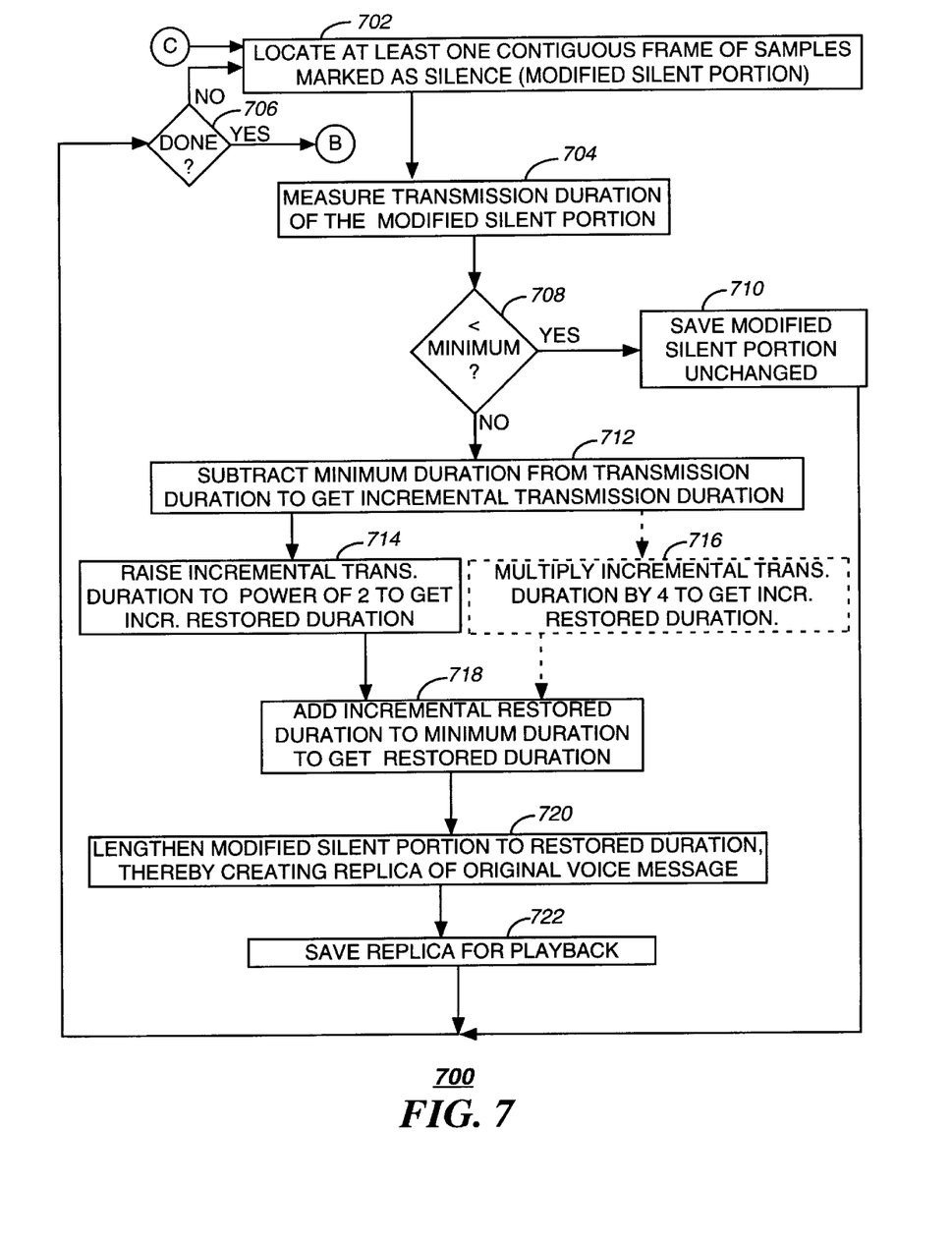
FIG. 7 is a flow chart depicting a method for processing periods of silence in speech in the subscriber unit in accordance with the present invention.

FIG. 7 is a flow chart 700 depicting a method for processing periods of silence in speech in the subscriber unit 122 in accordance with the present invention. Before entering the flow chart 700 the processing system 306 preferably performs the steps of the flow charts 400, 500 depicting a method for differentiating speech from silence, as described herein above. After the N frames of samples of the buffer have been marked as being either speech or silence, at step 702 the processing system 306 examines the buffer to locate at least one contiguous frame of samples marked as silence. This silent portion of the message also is referred to herein as the "modified silent portion." The processing system 306 then measures 704 the transmission duration of the modified silent portion, e.g., by counting the number of frames in the modified silent portion. The processing system 306 then checks 708 whether the duration is less than the predetermined minimum duration, e.g., 40 milliseconds. If so, the processing system 306 will save the original silent portion unchanged in the message storage element 326. If however, the duration is not less than the predetermined minimum duration, then the processing system 306 subtracts 712 the predetermined minimum duration from the transmission duration to derive the incremental transmission duration. The processing system 306 then preferably raises 714 the incremental transmission duration to a power, e.g., 2 to derive the incremental restored duration. Alternatively, the processing system 306 can multiply the incremental duration by a number greater than one, e.g., 4, to derive the incremental restored duration. It will be appreciated that other mathematical functions can be applied as well to restore the duration of the original silent portion before playback. It will be further appreciated that to conserve processing power, the duration values can be measured in relatively large segments and rounded to integer values, as great accuracy is not required. For example, duration can be expressed in segments of 5 milliseconds each (20 msec.=4 segments; 33 msec.=7 segments; 157 msec.=31 segments).

After applying the duration restoring function, the processing system 306 adds 718 the incremental restored duration to the predetermined minimum duration to derive the restored duration (i.e., the actual duration which will be used when reproducing the silent portion). Next the processing system 306 lengthens the modified silent portion to the mathematically derived restored duration, thereby creating a replica of the original voice message. The lengthening is preferably accomplished through well-known overlap-add techniques. Alternatively, a correct duration of pure silence or artificially generated noisy silence can be substituted for the modified silent portion, as well. The processing system 306 then saves 722 the replica in the message storage element 326, where the replica will await playback by the subscriber unit 122. Flow then proceeds to step 706 where the processing system 306 checks whether the entire buffer has been processed. If not, the flow returns to step 702 to search for another silent portion to process. If, on the other hand, at step 706 the entire buffer has been processed, then the flow returns to step 404 (FIG. 4) to get another buffer of N frames of samples.

When the signal-to-noise ratio of the received signal at the subscriber unit 122 falls too low for the processing system 306 to detect a modified silent portion of the transmitted voice message, the modified silent portion will not be restored and will remain shortened. This is actually desirable, because in a noisy environment silence gaps are kept short instead of expanding the high noise level to the full duration of the original gap.

To provide an example of how an embodiment in accordance with the present invention operates end-to-end, let us continue the exemplary system described herein above, using as the mathematical functions a square root at the controller 112 and a power of 2 at the subscriber unit 122, setting the predetermined minimum duration at 40 msec., and measuring duration in segments of 5 msec. Let's assume that the original message contains three original silent portions of 30 msec., 60 msec., and 130 msec. The 30 msec. silent portion is too short (less than 8 segments) to be further shortened, so it is sent unchanged to the subscriber unit 122. The 60 msec silent portion is 12 segments in duration, thus the incremental duration is 12−8=4 segments. The square root of 4 is 2. Adding back the minimum duration, the transmission duration is 8+2=10 segments. The controller 112 then preferably uses overlap-add techniques to shorten the 60 msec. silent portion to 50 msec. The 130 msec. silent portion is 26 segments, giving an incremental duration of 26−8=18 segments. The square root of 18 is about 4. Adding back the minimum duration gives a transmission duration of 12 segments (60 msec).

At the subscriber unit 122 when the processing system 306 locates the 30 msec. silent portion, it saves it unchanged, because it is less than the minimum 8 segments. The 50 msec. (10 segment) silent portion produces an incremental transmission duration of 2 segments. The square of 2 is 4. The restored duration is 12 segments, or 60 msec. Thus the restored duration is exactly that of the original. Similarly, the received 12 segment silent portion is restored to 24 segments (120 msec.) This is in error by 10 msec., an amount considered well within the accuracy required.

Thus, it should be clear from the preceding disclosure that the present invention provides a method and apparatus for achieving a greater compression ratio for transmitting speech pauses. The method and apparatus advantageously accomplish this in a manner that restores the pauses during message playback so that the rhythm of the message remains natural.

Many modifications and variations of the present invention are possible in light of the above teachings. Thus, it is to be understood that, within the scope of the appended claims, the invention can be practiced other than as described herein above.

What is claimed is:

1. A method for reducing a transmission time required for communicating an original silent portion of an original voice message in a wireless voice messaging system, the original silent portion having an original duration, the method comprising the steps of:

processing the original voice message to detect the original silent portion and to measure the original duration;

creating a modified voice message, when the original duration is not less than a predetermined minimum duration that can be reliably detected by a subscriber unit, by replacing the original silent portion with a modified silent portion having a transmission duration equal to a sum of an incremental transmission duration and the predetermined minimum duration, wherein the incremental transmission duration is mathematically derived from an incremental duration and is shorter than the incremental duration, and wherein the incremental duration is equal to the original duration less the predetermined minimum duration; and transmitting the modified voice message by the wireless voice messaging system to improve transmission efficiency by utilizing a greater compression ratio for speech pauses than is possible for voiced and unvoiced speech.

2. The method of claim 1, further comprising the steps of:

comparing the original duration with a predetermined minimum duration; and negating the creating step, and transmitting the original silent portion when the original duration is less than the predetermined minimum duration.

3. The method of claim 1, wherein the creating step comprises the step of multiplying the incremental transmission duration by a predetermined number less than one.

4. The method of claim 1, wherein the creating step comprises the step of raising the incremental transmission duration to a predetermined power greater than zero and less than one.

5. The method of claim 1, further comprising the steps of:

receiving the modified voice message;

processing the modified voice message to detect the modified silent portion and to measure the transmission duration; and forming a replica of the original voice message by replacing the modified silent portion with a restored silent portion having a restored duration, wherein the restored duration is derived from the transmission duration, and wherein the restored duration is longer than the transmission duration.

6. The method of claim 5, further comprising the steps of:

comparing the transmission duration with a predetermined minimum duration; and negating the forming step, and making the replica of the original voice message by using the transmission duration, without modification, for the restored silent portion when the transmission duration is less than the predetermined minimum duration.

7. The method of claim 5, wherein the forming step comprises the steps of:

subtracting a predetermined minimum duration from the transmission duration to derive an incremental transmission duration;

applying a mathematical function to the incremental transmission duration to derive an incremental restored duration; and adding the incremental restored duration to the predetermined minimum duration to derive the restored duration.

8. The method of claim 7, wherein the applying step comprises the step of multiplying the incremental transmission duration by a predetermined number greater than one.

9. The method of claim 7, wherein the applying step comprises the step of raising the incremental transmission duration to a predetermined power greater than one.

10. A controller for reducing a transmission time required for communicating an original silent portion of an original voice message in a wireless voice messaging system, the original silent portion having an original duration, the controller comprising:

an input interface for receiving the original voice message;

a processing system coupled to the input interface for processing the original voice message to detect the original silent portion and to measure the original duration, wherein the processing system is programmed to create a modified voice message, when the original duration is not less than a predetermined minimum duration that can be reliably detected by a subscriber unit by replacing the original silent portion with a modified silent portion having a transmission duration equal to a sum of an incremental transmission duration and the predetermined minimum duration, and wherein the incremental transmission duration is mathematically derived from an incremental duration and is shorter than the incremental duration, and wherein the incremental duration is equal to the original duration less the predetermined minimum duration; and an output interface coupled to the processing system for transmitting the modified voice message by the wireless voice messaging system to improve transmission efficiency by utilizing a greater compression ratio for speech pauses than is possible for voiced and unvoiced speech.

11. The controller of claim 10, wherein the processing system is further programmed to:

compare the original duration with a predetermined minimum duration; and transmit the original silent portion, without modification, when the original duration is less than the predetermined minimum duration.

12. The controller of claim 10, wherein the processing system is further programmed to multiply the incremental transmission duration by a predetermined number less than one.

13. The controller of claim 10, wherein the processing system is further programmed to raise the incremental transmission duration to a predetermined power greater than zero and less than one.

14. A subscriber unit, comprising:

a wireless receiver for receiving a modified voice message including a modified silent portion having a transmission duration;

a processing system coupled to the wireless receiver for processing the modified voice message to detect the modified silent portion and to measure the transmission duration, wherein the processing system is programmed to form a replica of an original voice message by replacing the modified silent portion with a restored silent portion having a restored duration, wherein the restored duration is derived from the transmission duration, and wherein the restored duration is longer than the transmission duration; and an audio interface coupled to the processing system for reproducing the replica of the original voice message in a manner that restores pauses during message playback so that rhythm of the message remains natural.

15. The subscriber unit of claim 14, wherein the processing system is further programmed to:

compare the transmission duration with a predetermined minimum duration; and make the replica of the original voice message by using the transmission duration, without modification, for the restored silent portion when the transmission duration is less than the predetermined minimum duration.

16. The subscriber unit of claim 14, wherein the processing system is further programmed to:

subtract a predetermined minimum duration from the transmission duration to derive an incremental transmission duration;

apply a mathematical function to the incremental transmission duration to derive an incremental restored duration; and add the incremental restored duration to the predetermined minimum duration to derive the restored duration.

17. The subscriber unit of claim 16, wherein the processing system is further programmed to multiply the incremental transmission duration by a predetermined number greater than one.

18. The subscriber unit of claim 16, wherein the processing system is further programmed to raise the incremental transmission duration to a predetermined power greater than one.

* * * * *